United States Patent
Valverde, Jr. et al.

(10) Patent No.: US 10,282,797 B2
(45) Date of Patent: May 7, 2019

(54) INFERENCE MODEL FOR TRAVELER CLASSIFICATION

(71) Applicant: Amgine Technologies (US), Inc., Austin, TX (US)

(72) Inventors: L. James Valverde, Jr., Washington, DC (US); Harold Roy Miller, Toronto (CA); Jonathan David Miller, Austin, TX (US)

(73) Assignee: Amgine Technologies (US), Inc., Austin, TX (US)

( * ) Notice: Subject to any disclaimer, the term of this patent is extended or adjusted under 35 U.S.C. 154(b) by 0 days.

(21) Appl. No.: 14/676,302

(22) Filed: Apr. 1, 2015

(65) Prior Publication Data

US 2015/0278970 A1    Oct. 1, 2015

Related U.S. Application Data

(60) Provisional application No. 61/973,695, filed on Apr. 1, 2014.

(51) Int. Cl.
*G06Q 30/06* (2012.01)
*G06Q 50/14* (2012.01)

(52) U.S. Cl.
CPC ......... *G06Q 50/14* (2013.01); *G06Q 30/0631* (2013.01)

(58) Field of Classification Search
CPC .................................. G06Q 30/0631
USPC ....................................... 705/26.7
See application file for complete search history.

(56) References Cited

U.S. PATENT DOCUMENTS

| 5,557,524 A * | 9/1996 | Maki ................ G01C 21/20 340/995.1 |
| 5,832,452 A | 11/1998 | Schneider et al. |
| 5,948,040 A * | 9/1999 | DeLorme ............ G01C 21/36 340/990 |
| 6,275,808 B1 | 8/2001 | DeMarcken |
| 6,477,520 B1 * | 11/2002 | Malaviya et al. .............. 706/47 |
| 6,553,310 B1 | 4/2003 | Lopke |

(Continued)

FOREIGN PATENT DOCUMENTS

| CA | 2830228 C | 8/2017 |
| WO | WO2012125742 | 9/2012 |

(Continued)

OTHER PUBLICATIONS

Non-Final Office Action, dated Mar. 11, 2015, U.S. Appl. No. 13/420,433, filed Mar. 14, 2012.

(Continued)

*Primary Examiner* — Alexis M Casey
(74) *Attorney, Agent, or Firm* — Carr & Ferrell LLP

(57) ABSTRACT

A method for classifying a prospective traveler based on statistical inference is described herein. The method comprises receiving an input associated with the prospective traveler. Encoded representation of preferences and goals may be extracted from the input and levels and may be assigned to the preferences and goals. Based on the levels assigned to the preferences and goals, the prospective traveler may be classified according to one or more traveler profiles. Based on the classification, one or more consumer choices may be offered to the prospective traveler.

19 Claims, 14 Drawing Sheets

(56) References Cited

U.S. PATENT DOCUMENTS

| | | | |
|---|---|---|---|
| 6,795,710 B1* | 9/2004 | Creemer | H04W 4/029 455/456.3 |
| 7,092,892 B1* | 8/2006 | Sobalvarro | G06Q 10/02 705/27.1 |
| 7,219,073 B1 | 5/2007 | Taylor et al. | |
| 7,286,998 B2* | 10/2007 | Sauser | G06Q 10/02 705/7.37 |
| 7,860,808 B2* | 12/2010 | Peters | G06Q 99/00 180/2.2 |
| 7,979,457 B1 | 7/2011 | Garman | |
| 7,983,956 B1* | 7/2011 | Goel | G06Q 10/02 705/26.1 |
| 8,035,511 B2* | 10/2011 | Weaver | G01D 21/00 340/539.22 |
| 8,165,920 B2* | 4/2012 | Goel | G06Q 10/02 705/26.1 |
| 8,332,247 B1* | 12/2012 | Bailey | G06Q 10/06375 705/13 |
| 8,600,784 B1 | 12/2013 | Ivey et al. | |
| 8,762,160 B2* | 6/2014 | Lulla | G06Q 10/02 705/1.1 |
| 9,043,151 B2* | 5/2015 | Cai | G01C 21/34 701/537 |
| 9,286,629 B2 | 3/2016 | Miller et al. | |
| 9,659,099 B2 | 5/2017 | Miller et al. | |
| 10,210,270 B2 | 2/2019 | Miller et al. | |
| 2001/0044788 A1 | 11/2001 | Demir et al. | |
| 2002/0069133 A1* | 6/2002 | Currie | A63B 53/007 705/26.41 |
| 2002/0082877 A1 | 6/2002 | Schiff et al. | |
| 2002/0147619 A1 | 10/2002 | Floss et al. | |
| 2002/0178034 A1* | 11/2002 | Gardner et al. | 705/5 |
| 2003/0018499 A1 | 1/2003 | Miller et al. | |
| 2003/0050846 A1* | 3/2003 | Rodon | G06Q 10/047 705/26.62 |
| 2003/0055690 A1 | 3/2003 | Garback | |
| 2003/0055772 A1 | 3/2003 | Goldstein | |
| 2003/0135458 A1 | 7/2003 | Tadano et al. | |
| 2003/0177044 A1 | 9/2003 | Sokel et al. | |
| 2003/0217052 A1 | 11/2003 | Rubenczyk et al. | |
| 2004/0044516 A1 | 3/2004 | Kennewick et al. | |
| 2004/0078213 A1 | 4/2004 | Brice et al. | |
| 2004/0111255 A1 | 6/2004 | Huerta et al. | |
| 2004/0220854 A1* | 11/2004 | Postrel | 705/14 |
| 2004/0249680 A1 | 12/2004 | Liew et al. | |
| 2005/0038644 A1 | 2/2005 | Napper et al. | |
| 2005/0043940 A1 | 2/2005 | Elder | |
| 2005/0108068 A1 | 5/2005 | Marcken et al. | |
| 2005/0220278 A1 | 10/2005 | Zirngibl et al. | |
| 2005/0267651 A1 | 12/2005 | Arango et al. | |
| 2005/0288973 A1 | 12/2005 | Taylor et al. | |
| 2006/0106655 A1* | 5/2006 | Lettovsky | G06Q 10/02 705/6 |
| 2006/0178931 A1* | 8/2006 | Horn | G06Q 10/0637 705/14.62 |
| 2006/0241983 A1 | 10/2006 | Viale et al. | |
| 2006/0247954 A1 | 11/2006 | Hunt | |
| 2006/0265508 A1 | 11/2006 | Angel et al. | |
| 2006/0285662 A1 | 12/2006 | Yin et al. | |
| 2006/0293930 A1* | 12/2006 | Rodgers | G06Q 10/02 705/5 |
| 2007/0073563 A1 | 3/2007 | Dourthe et al. | |
| 2007/0100962 A1 | 5/2007 | Barth et al. | |
| 2007/0106497 A1 | 5/2007 | Ramsey et al. | |
| 2007/0143154 A1 | 6/2007 | Ashby et al. | |
| 2007/0156469 A1 | 7/2007 | Bird et al. | |
| 2007/0168245 A1 | 7/2007 | de Marcken et al. | |
| 2007/0174350 A1 | 7/2007 | Pell et al. | |
| 2007/0192186 A1 | 8/2007 | Greene et al. | |
| 2007/0198442 A1* | 8/2007 | Horn | G06Q 30/02 705/500 |
| 2007/0203735 A1 | 8/2007 | Ashton | |
| 2007/0208503 A1 | 9/2007 | Harnsberger | |
| 2007/0276595 A1 | 11/2007 | Lewinson et al. | |
| 2007/0294149 A1 | 12/2007 | Lu et al. | |
| 2008/0021748 A1 | 1/2008 | Bay et al. | |
| 2008/0046274 A1* | 2/2008 | Geelen | G01C 21/32 717/176 |
| 2008/0052217 A1 | 2/2008 | Etkin | |
| 2008/0059454 A1 | 3/2008 | Andrieu | |
| 2008/0091525 A1 | 4/2008 | Kretz | |
| 2008/0103949 A1 | 5/2008 | Lobana et al. | |
| 2008/0109232 A1 | 5/2008 | Musgrove et al. | |
| 2008/0114623 A1 | 5/2008 | Berthaud et al. | |
| 2008/0120306 A1 | 5/2008 | Panabaker et al. | |
| 2008/0201178 A1 | 8/2008 | Vizitei | |
| 2008/0319803 A1 | 12/2008 | Heyraud et al. | |
| 2009/0006143 A1 | 1/2009 | Orttung et al. | |
| 2009/0048876 A1 | 2/2009 | Bonissone et al. | |
| 2009/0063359 A1 | 3/2009 | Connors | |
| 2009/0070322 A1 | 3/2009 | Salvetti et al. | |
| 2009/0112639 A1 | 4/2009 | Robinson Beaver | |
| 2009/0157312 A1 | 6/2009 | Black et al. | |
| 2009/0157664 A1 | 6/2009 | Wen | |
| 2009/0210262 A1 | 8/2009 | Rines et al. | |
| 2009/0216633 A1 | 8/2009 | Whitsett et al. | |
| 2009/0234681 A1 | 9/2009 | Champernowne | |
| 2009/0240517 A1 | 9/2009 | Pelter | |
| 2009/0319305 A1 | 12/2009 | Weissert et al. | |
| 2009/0327148 A1* | 12/2009 | Kamar | G06Q 30/06 705/80 |
| 2010/0010841 A1 | 1/2010 | Cooper et al. | |
| 2010/0010978 A1 | 1/2010 | Carapella et al. | |
| 2010/0030594 A1* | 2/2010 | Swart | G06Q 10/025 705/6 |
| 2010/0153292 A1* | 6/2010 | Zheng | G06Q 30/02 705/347 |
| 2010/0217680 A1 | 8/2010 | Fusz et al. | |
| 2010/0217723 A1* | 8/2010 | Sauerwein, Jr. | G06K 7/0004 705/337 |
| 2010/0318386 A1 | 12/2010 | Vaughan et al. | |
| 2011/0046989 A1 | 2/2011 | Crean et al. | |
| 2011/0093361 A1 | 4/2011 | Morales | |
| 2011/0125578 A1* | 5/2011 | Alspector | G06F 17/30867 705/14.53 |
| 2011/0137766 A1* | 6/2011 | Rasmussen | G01C 21/32 705/30 |
| 2011/0153373 A1 | 6/2011 | Dantzig et al. | |
| 2011/0167003 A1 | 7/2011 | Nice et al. | |
| 2011/0231182 A1 | 9/2011 | Weider et al. | |
| 2011/0246246 A1 | 10/2011 | Johnson | |
| 2011/0295692 A1* | 12/2011 | Zivkovic | G06Q 30/02 705/14.58 |
| 2011/0307241 A1 | 12/2011 | Waibel et al. | |
| 2012/0054001 A1* | 3/2012 | Zivkovic | G06Q 30/0207 705/14.1 |
| 2012/0059679 A1 | 3/2012 | de Marcken et al. | |
| 2012/0233207 A1 | 9/2012 | Mohajer | |
| 2012/0239440 A1 | 9/2012 | Miller et al. | |
| 2012/0239443 A1* | 9/2012 | Miller et al. | 705/6 |
| 2012/0239455 A1* | 9/2012 | Crean | G06Q 10/02 705/7.31 |
| 2012/0239584 A1* | 9/2012 | Yariv | G01C 21/3438 705/319 |
| 2012/0239669 A1 | 9/2012 | Miller et al. | |
| 2012/0259667 A1 | 10/2012 | Pelissier et al. | |
| 2012/0265598 A1* | 10/2012 | Krone | G06Q 30/02 705/14.35 |
| 2013/0041696 A1 | 2/2013 | Richard | |
| 2013/0054375 A1 | 2/2013 | Sy et al. | |
| 2013/0073325 A1 | 3/2013 | Ross | |
| 2013/0096965 A1 | 4/2013 | Pappas et al. | |
| 2013/0132129 A1 | 5/2013 | Fox et al. | |
| 2013/0151291 A1 | 6/2013 | Salway | |
| 2013/0158821 A1* | 6/2013 | Ricci | H04W 4/90 701/51 |
| 2013/0159023 A1 | 6/2013 | Srinivas et al. | |
| 2013/0166329 A1 | 6/2013 | Amoux-Prost et al. | |
| 2013/0304349 A1 | 11/2013 | Davidson | |
| 2013/0339105 A1* | 12/2013 | Russell | H04W 4/029 705/7.42 |

(56) References Cited

U.S. PATENT DOCUMENTS

| | | | |
|---|---|---|---|
| 2014/0019176 | A1 | 1/2014 | Mandelbaum |
| 2014/0025540 | A1* | 1/2014 | Hendrickson ............... 705/26.81 |
| 2014/0074746 | A1* | 3/2014 | Wang .................... G06Q 10/083 705/341 |
| 2014/0089020 | A1 | 3/2014 | Murphy |
| 2014/0089036 | A1* | 3/2014 | Chidlovskii ........... G06Q 10/06 705/7.27 |
| 2014/0089101 | A1* | 3/2014 | Meller ............... G06Q 30/0269 705/14.66 |
| 2014/0114705 | A1 | 4/2014 | Bashvitz et al. |
| 2014/0156411 | A1* | 6/2014 | Murgai ............... G06Q 30/0269 705/14.58 |
| 2014/0229102 | A1 | 8/2014 | Bapna et al. |
| 2014/0257949 | A1* | 9/2014 | Gishen ............... G06Q 30/0252 705/14.5 |
| 2014/0279196 | A1 | 9/2014 | Wilson et al. |
| 2014/0330605 | A1* | 11/2014 | Connolly ....... G06Q 10/063116 705/7.16 |
| 2014/0330606 | A1* | 11/2014 | Paget ............... G06Q 10/06311 705/7.18 |
| 2014/0330621 | A1* | 11/2014 | Nichols ............ G06Q 10/06393 705/7.39 |
| 2014/0337063 | A1 | 11/2014 | Nelson et al. |
| 2015/0012309 | A1* | 1/2015 | Buchheim ............ G07B 15/063 705/5 |
| 2015/0046201 | A1 | 2/2015 | Miller et al. |
| 2015/0066594 | A1* | 3/2015 | Li ...................... G06Q 30/0202 705/7.31 |
| 2015/0066830 | A1 | 3/2015 | Wilson et al. |
| 2015/0235478 | A1* | 8/2015 | Blandin ................. G07B 15/06 705/7.35 |
| 2015/0242927 | A1* | 8/2015 | Will .................... G06Q 30/0629 705/26.64 |
| 2016/0125559 | A1 | 5/2016 | Shekou |
| 2016/0196271 | A1 | 7/2016 | Miller et al. |
| 2016/0202073 | A1 | 7/2016 | Claycomb et al. |
| 2016/0203422 | A1 | 7/2016 | Demarchi et al. |
| 2016/0232626 | A1 | 8/2016 | Geraci et al. |
| 2016/0258767 | A1 | 9/2016 | Nevrekar et al. |
| 2016/0364815 | A1 | 12/2016 | Miller et al. |
| 2016/0370197 | A1 | 12/2016 | Miller et al. |
| 2016/0371799 | A1 | 12/2016 | Miller et al. |
| 2016/0379142 | A1 | 12/2016 | Valverde, Jr. et al. |
| 2017/0293722 | A1 | 10/2017 | Valverde, Jr. et al. |
| 2017/0316103 | A1 | 11/2017 | Miller et al. |
| 2018/0336642 | A1 | 11/2018 | Miller |
| 2018/0347995 | A1 | 12/2018 | Valverde, Jr. et al. |
| 2019/0012712 | A1 | 1/2019 | Miller et al. |

FOREIGN PATENT DOCUMENTS

| | | |
|---|---|---|
| WO | WO2012125753 | 9/2012 |
| WO | WO2012125761 | 9/2012 |
| WO | WO2015021180 | 2/2015 |
| WO | WO2015153776 A1 | 10/2015 |
| WO | WO2016201134 A1 | 12/2016 |
| WO | WO2016205076 A1 | 12/2016 |
| WO | WO2016205280 A1 | 12/2016 |
| WO | WO2016209679 A1 | 12/2016 |
| WO | WO2017180483 A1 | 10/2017 |

OTHER PUBLICATIONS

Non-Final Office Action, dated Dec. 16, 2013, U.S. Appl. No. 13/419,989, filed Mar. 14, 2012.
Final Office Action, dated Jul. 1, 2014, U.S. Appl. No. 13/419,989, filed Mar. 14, 2012.
Non-Final Office Action, dated Dec. 5, 2014, U.S. Appl. No. 13/419,989, filed Mar. 14, 2012.
Non-Final Office Action, dated Oct. 21, 2014, U.S. Appl. No. 13/420,179, filed Mar. 14, 2012.
Final Office Action, dated Mar. 5, 2015, U.S. Appl. No. 13/420,179, filed Mar. 14, 2012.
International Search Report and Written Opinion dated Jun. 15, 2012 in Patent Cooperation Treaty application No. PCT/US2012/029121, filed Mar. 14, 2012, 8 pp.
International Search Report and Written Opinion dated Jun. 7, 2012 in application No. PCT/US2012/029098, filed Mar. 14, 2012, 6 pp.
International Search Report and Written Opinion dated Mar. 14, 2013 in application No. PCT/US2012/029112, filed Mar. 14, 2012, 6pp.
International Search Report and Written Opinion dated Nov. 24, 2014 in application No. PCT/US2014/049979, filed Aug. 6, 2014, 9pp.
United Hub. "FareLock: An Opportunity to Lock in Your Ticket Price for up to Seven Days." United Hub. Aug. 17, 2012. Retrieved on Oct. 17, 2014 from Internet URL <https://hub.united.com/en-us/news/products-services/pages/farelock-lets-you-lock-in-your-ticket-price.aspx>, 3pp.
MacKenzie, Scott. "Two Services Help You Lock in a Good Deal on Airfare." Hack My Trip. Apr. 2014. Retrieved on Oct. 17, 2014 from Internet URL <http://hackmytrip.com/2014/04/two-services-help-lock-good-deal-airfare/>, 9pp.
Boardman, Al. "Options Away." Vimeo. May 24, 2013. Retrieved on Oct. 17, 2014 from Internetnet URL <http://vimeo.com/66936261>, 2pp.
International Search Report and Written Opinion dated Jul. 2, 2015 in Patent Cooperation Treaty application No. PCT/US2015/023901, filed Apr. 1, 2015.
"Office Action" Canadian Patent Application No. 2830228 dated Feb. 26, 2016, 3 pages.
"Office Action," Canadian Patent Application No. 2830224, dated May 18, 2016, 6 pages.
"Office Action," Canadian Patent Application No. 2830229, dated May 19, 2016, 4 pages.
"International Search Report" and "Written Opinion," Patent Cooperation Treaty application No. PCT/US2016/037555, dated Jul. 11, 2016, 13 pages.
"International Search Report" and "Written Opinion," Patent Cooperation Treaty application No. PCT/US2016/036760, dated Sep. 1, 2016, 12 pages.
"International Search Report" and "Written Opinion," Patent Cooperation Treaty application No. PCT/US2016/037503, dated Sep. 9, 2016, 10 pages.
"International Search Report" and "Written Opinion," Patent Cooperation Treaty application No. PCT/US2016/036749, dated Sep. 27, 2016, 13 pages.
"Notice of Allowance," Canadian Patent Application No. 2830228, dated Jan. 12, 2017, 1 pages.
"Notice of Allowance," Canadian Patent Application No. 2830224, dated May 4, 2017, 1 page.
"Office Action," Canadian Patent Application No. 2830229, dated Apr. 28, 2017, 4 pages.
"International Search Report" and "Written Opinion," Patent Cooperation Treaty Application No. PCT/US2017/026708, dated Jul. 7, 2017, 13 pages.
Subramoni, Hari, "Topology-Aware MPI Communication and Scheduling for High Performance Computing Systems," Ohio State University, 2013, 151 pages.
Tablan, Valentin et al., "A Natural Language Query Interface to Structured Information," The Semantic Web: Research and Applications, ESWC 2008: Lecture Notes in Computer Science, vol. 5021, pp. 361-375.
United Airlines. "FareLock" webpage. Jul. 28, 2012. Retrieved from the Internet: <https://www.united.com/CMS/en-US/products/travel/products/Pages/FareLock.aspx> (http://web.archive.org/web/20120728071904/https://www.united.com/CMS/en-US/products/travelproducts/Pages/FareLock.aspx> captured on Jul. 28, 2012 using Wayback Machine), 4 pages.
Federal Trade Commission. "Using Layaway Plans" webpage. Dec. 19, 2012. Retrieved from the Internet: <htttps://www.consumer.ftc.gov/articles/0128-using-layaway-plans> (<http://web.archive.org/

(56) References Cited

OTHER PUBLICATIONS web/20121219044435/htttps://www.consumer.ftc.gov/articles/0128-using-layaway-plans> captured on Dec. 19, 2012 using Wayback Machine), 2 pages.

* cited by examiner

| Preference Type | Leisure | Self-Pay Business | Reimbursed Business | Business Class |
|---|---|---|---|---|
| Class of Service Requested 404 | Low | Low | Low | Medium |
| Booking Delta 406 | High | Medium | Medium | Low |
| Ticket Fare Level 408 | Low | Low | Low | High |
| Connection Count 410 | Medium | Medium | Medium | Low |
| Travel Speed 412 | Medium | Medium | Medium | Medium |
| Connection Time Sum 414 | Medium | Low | Low | Low |
| Departure Time 416 | Medium | Medium | Medium | Medium |

Leisure             = (L, H, L, M, M, M, M)
Self-Paying Business = (L, M, L, M, M, L, M)
Reimbursed Business  = (L, L, M, L, M, L, M)
Business Class       = (M, L, H, L, M, L, M)

| c | $x_1^*$ | $x_2^*$ | $x_3^*$ | $x_4^*$ |
|---|---|---|---|---|
| Low | 0.800 | 0.361 | 0.015 | 0.001 |
| Medium | 0.199 | 0.628 | 0.417 | 0.191 |
| High | 0.001 | 0.011 | 0.568 | 0.808 |

FIG. 4

|  |  | Time Sensitivity | | |
|---|---|---|---|---|
|  |  | Low | Medium | High |
|  | Prior Probabilities | 0.3 | 0.4 | 0.3 |
| Class of Service | Low | 0.7 | 0.2 | 0.2 |
|  | Medium | 0.2 | 0.3 | 0.2 |
|  | High | 0.1 | 0.5 | 0.6 |
| Booking Delta | Low | 0.1 | 0.3 | 0.7 |
|  | Medium | 0.2 | 0.4 | 0.2 |
|  | High | 0.7 | 0.3 | 0.1 |
| Fare Level | Low | 0.7 | 0.3 | 0.1 |
|  | Medium | 0.2 | 0.4 | 0.2 |
|  | High | 0.1 | 0.3 | 0.7 |
| Connection Count | Low | 0.1 | 0.3 | 0.8 |
|  | Medium | 0.3 | 0.4 | 0.1 |
|  | High | 0.6 | 0.3 | 0.1 |
| Travel Speed | Low | 0.2 | 0.3 | 0.1 |
|  | Medium | 0.6 | 0.4 | 0.2 |
|  | High | 0.2 | 0.3 | 0.7 |
| Conneciton Time | Low | 0.1 | 0.3 | 0.7 |
|  | Medium | 0.2 | 0.4 | 0.2 |
|  | High | 0.7 | 0.3 | 0.1 |
| Departure Time | Low | 0.7 | 0.3 | 0.1 |
|  | Medium | 0.2 | 0.4 | 0.2 |
|  | High | 0.1 | 0.3 | 0.7 |

FIG. 6

|  |  | Price Sensitivity | | |
|---|---|---|---|---|
|  |  | Low | Medium | High |
|  | Prior Probabilities | 0.3 | 0.4 | 0.3 |
| Class of Service | Low | 0.1 | 0.2 | 0.85 |
|  | Medium | 0.2 | 0.3 | 0.1 |
|  | High | 0.7 | 0.5 | 0.05 |
| Booking Delta | Low | 0.7 | 0.3 | 0.1 |
|  | Medium | 0.2 | 0.4 | 0.2 |
|  | High | 0.1 | 0.3 | 0.7 |
| Fare Level | Low | 0.1 | 0.3 | 0.7 |
|  | Medium | 0.2 | 0.4 | 0.2 |
|  | High | 0.7 | 0.3 | 0.1 |
| Connection Count | Low | 0.7 | 0.3 | 0.1 |
|  | Medium | 0.2 | 0.4 | 0.2 |
|  | High | 0.1 | 0.3 | 0.7 |
| Travel Speed | Low | 0.7 | 0.3 | 0.1 |
|  | Medium | 0.2 | 0.4 | 0.2 |
|  | High | 0.1 | 0.3 | 0.7 |
| Conneciton Time | Low | 0.7 | 0.3 | 0.1 |
|  | Medium | 0.2 | 0.4 | 0.2 |
|  | High | 0.1 | 0.3 | 0.7 |
| Departure Time | Low | 0.1 | 0.3 | 0.7 |
|  | Medium | 0.2 | 0.4 | 0.2 |
|  | High | 0.7 | 0.3 | 0.1 |

FIG. 8

| Prior Probabilities | | Low | Medium | High |
|---|---|---|---|---|
| Class of Service | Low | 0.3 | 0.4 | 0.3 |
| | Medium | 0.85 | 0.3 | 0.1 |
| | High | 0.1 | 0.6 | 0.2 |
| | | 0.05 | 0.1 | 0.7 |
| Fare Level | Low | 0.7 | 0.3 | 0.1 |
| | Medium | 0.2 | 0.4 | 0.2 |
| | High | 0.1 | 0.3 | 0.7 |

INFERENCE MODEL FOR TRAVELER CLASSIFICATION

CROSS-REFERENCE TO RELATED APPLICATIONS

The present utility patent application is related to and claims priority benefit of the U.S. provisional application No. 61/973,695, filed on Apr. 1, 2014 under 35 U.S.C. 119(e). The content of the provisional application is incorporated herein by reference for all purposes to the extent that such subject matter is not inconsistent herewith or limiting hereof.

TECHNICAL FIELD

The present disclosure relates to data processing and, more particularly, to an inference model for traveler classification.

BACKGROUND

The ever increasing supply of goods and services provides prospective buyers with an infinite number of choices. However, it is often left to the prospective buyers to sift through these choices in order to find the ones that are most suitable. Oftentimes, this result in poor choices. To provide a more targeted approach, vendors may ask prospective buyers to provide preferences so that better fitting products may be presented. However, this requires additional effort on part of the prospective buyers. Additionally, the information provided by the prospective buyers may be subjective or intentionally misleading.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to one example embodiment of the disclosure, a system for classifying a prospective traveler based on statistical inference is provided. The system for classifying a prospective traveler based on statistical inference can include at least one processor and a database in communication with the processor. The processor may be configured to receive input associated with the prospective traveler and extract encoded representation of preferences and goals from the input. The processor may assign levels to the preferences and goals, classify the prospective traveler according to one or more traveler profiles based on the levels assigned to the preferences and goals, and based on the classification, offer one or more consumer choices to the prospective traveler. The database may be configured to store at least the input, the preferences, and the goals with the assigned levels, and so forth.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

FIG. 4 illustrates preference-level combinations that characterize example traveler profiles in airline markets.

FIG. 6 shows a conditional probability table for a time sensitivity network.

FIG. 8 shows a conditional probability table for a price sensitivity network.

DETAILED DESCRIPTION

Figure 1:
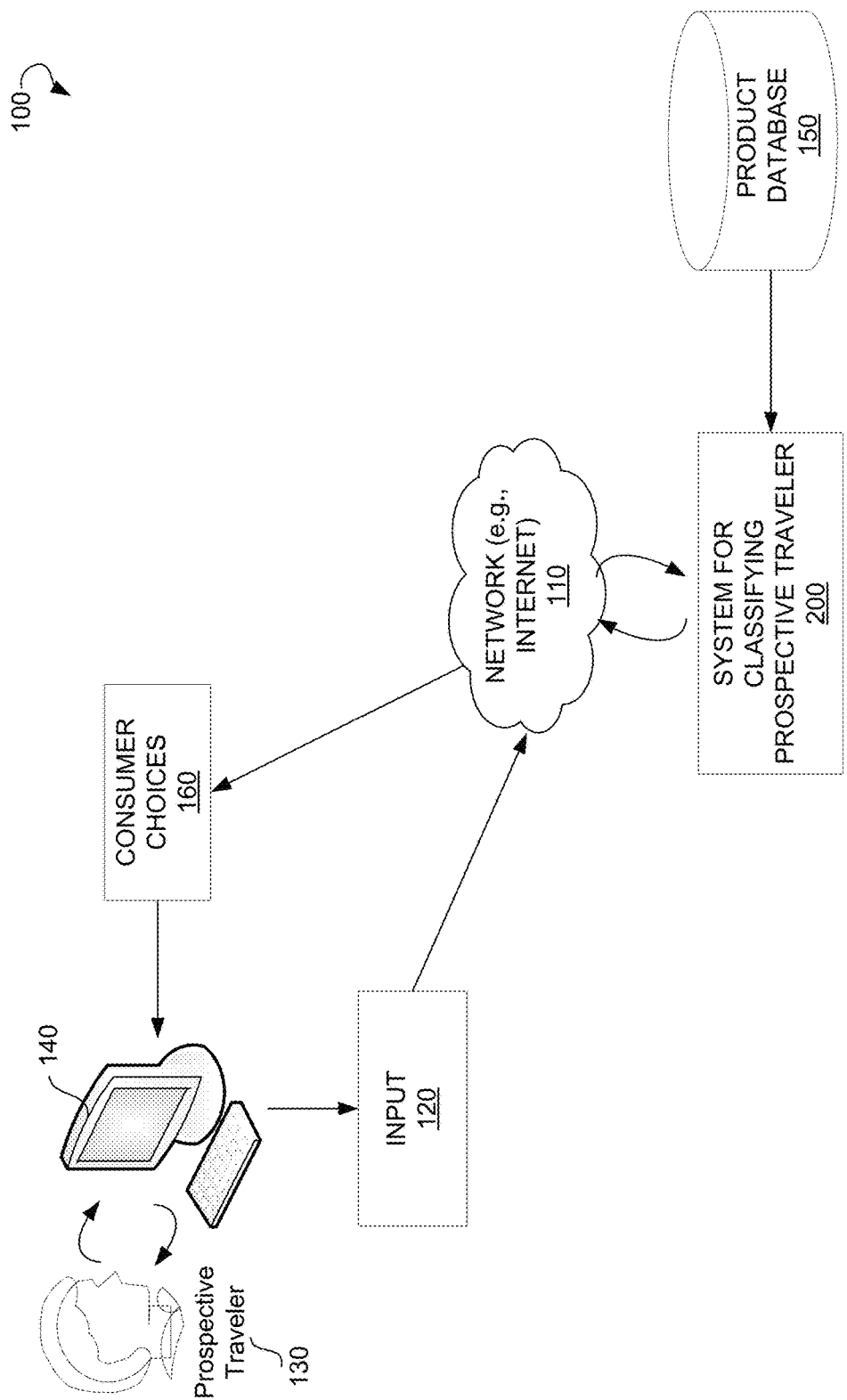
FIG. 1 illustrates an environment within which systems and methods for classifying a prospective traveler based on statistical inference can be implemented.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

Product definition and product positioning rank is one of the challenging problems encountered within the fields of marketing, innovation management, and other sales related areas. Within the travel sector, product positioning requires an understanding of key drivers of consumer choice and consumer value. The key drivers may include goals and preferences of a prospective traveler, willingness of the prospective traveler to pay to accomplish certain goals, and product choice sets that align with the goals and preferences. Determining specific products that the prospective traveler is most likely to purchase facilitates the product selection process for the prospective traveler and increases the probability of a purchase.

To identify goals and preferences of a prospective traveler, free text data may be analyzed. The free text data may include natural language input of the prospective traveler, such as text entered via a keyboard or voice data, oral exchange, social network data associated with the prospective traveler, and so forth. The identified goals and preferences may be assigned levels to define a preference structure of the prospective traveler. The preference structure may be matched with traveler profiles to classify the prospective traveler according to one of the traveler profiles.

The traveler profiles may characterize the choice of the prospective traveler along several dimensions (for example, time sensitivity, price sensitivity, and content affinity). In some cases, the traveler profiles may include a leisure traveler, a self-paying business traveler, a reimbursed traveler, a business class traveler, and so forth. To assign the prospective traveler to a traveler profile, the highest probability of the prospective traveler fitting the one or more traveler profiles may be determined.

Based on the traveler profile or profiles assigned to the prospective traveler, a formal model of consumer choice may be constructed. Using the model, a set of customer choices consistent with the formal model may be identified and offered to the prospective traveler. The set may include a moderate number of choices (for example, ten customer choices). Thus, the prospective traveler has the products prioritized and displayed based on his profile.

Additionally, any responses of the prospective traveler to the offered set of customer choices may be analyzed. The analysis may determine that the assigned traveler profiles contradict or do not correspond to actual purchase decisions made by the prospective traveler. Based on the determination, the prospective traveler may be assigned different traveler profiles and offered customer choices corresponding to those profiles.

FIG. 1 illustrates an environment 100 within which the systems and methods for classifying a prospective traveler based on statistical inference can be implemented, in accordance to some embodiments. Input 120 associated with a prospective traveler 130 may be received, for example, via a user interface displayed on a user device 140. The input 120 may include free text data. The free text data may be obtained as a natural language input by the prospective traveler 130, by speech-to-text conversion of an oral exchange with the prospective traveler 130, or otherwise. In some embodiments, the prospective traveler 130 may be asked, in oral or written form, one or more motivating questions to receive relevant input 120.

The input 120 may be transmitted to the system 200 for classifying a prospective traveler via a network 110. The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a Universal Serial Bus (USB) connection or other wired or wireless, digital or analog interface or connection, mesh or Digi® networking. The network 110 may include any suitable number and type of devices (e.g., routers and switches) for forwarding commands, content, and/or web object requests from each client to the online community application and responses back to the clients.

The user device 140, in some example embodiments, may include a Graphical User Interface (GUI) for displaying the user interface associated with the system 200. In a typical GUI, instead of offering only text menus or requiring typed commands, the system 200 may present graphical icons, visual indicators, or special graphical elements called widgets that may be utilized to allow the prospective traveler 130 to interact with the system 200. The user device 140 may be configured to utilize icons used in conjunction with text, labels, or text navigation to fully represent the information and actions available to the prospective traveler 130.

The user device 140 may include a mobile telephone, a computer, a lap top, a smart phone, a tablet personal computer (PC), and so forth. The system 200 may be a server-based distributed application; thus, it may include a central component residing on a server and one or more client applications residing on one or more user devices and communicating with the central component via the network 110. The prospective traveler 130 may communicate with the system 200 via a client application available through the user device 140.

The central component of the system 200 may receive the input 120 and other data from various sources, which may include online directories, social networks, blogs, travel history, and so forth. For data retrieving, the system 200 may use a search engine (not shown). The system 200 may extract encoded representation of preferences and goals of the prospective traveler and assign levels to the preferences and goals. Based on the levels, the prospective traveler 130 may be classified according to traveler profiles.

Available products from a product database 150 may be analyzed with reference to the traveler profiles of the prospective traveler 130, and a set of consumer choices 160 suiting the profiles may be determined. The consumer choices 160 may be offered to the prospective traveler 130 by displaying them via the user interface on a screen of the user device 140.

Figure 2:
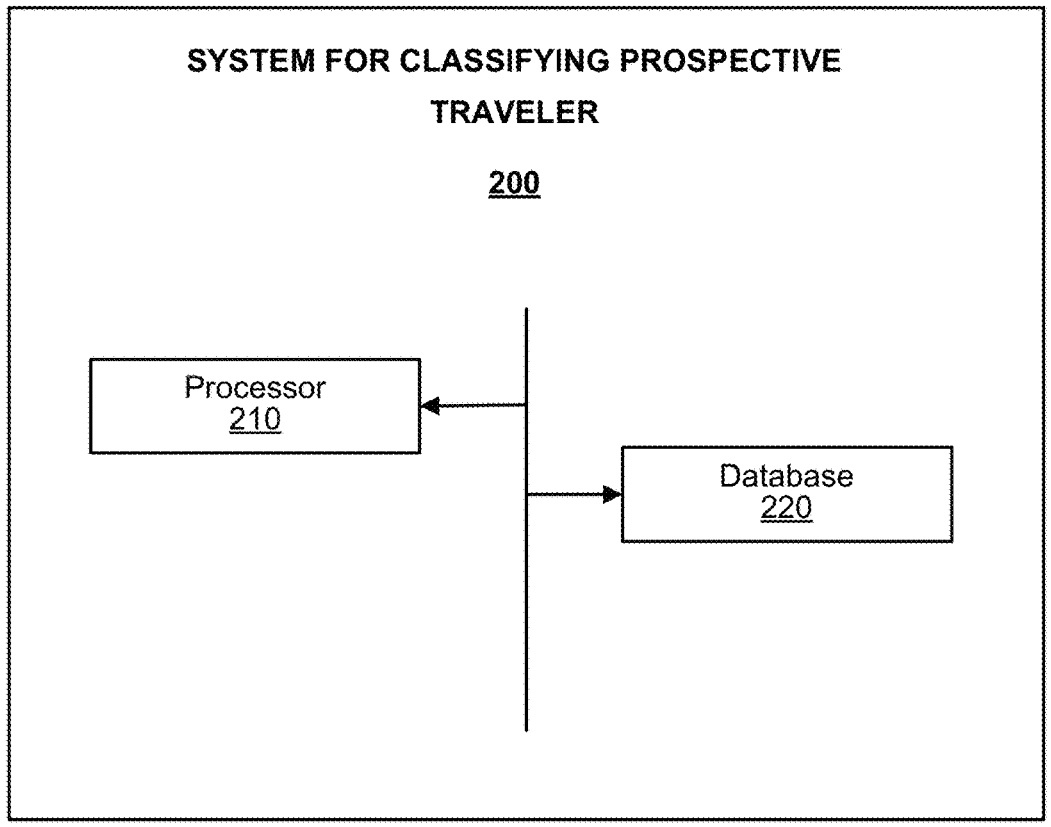
FIG. 2 is a block diagram showing various modules of the system for classifying prospective traveler.

FIG. 2 is a block diagram showing various modules of the system 200 for classifying a prospective traveler, in accordance with certain embodiments. The system 200 may comprise a processor 210 and a database 220. The processor 210 may include a programmable processor, such as a microcontroller, central processing unit (CPU), and so forth. In other embodiments, the processor 210 may include an application-specific integrated circuit (ASIC) or programmable logic array (PLA), such as a field programmable gate array (FPGA), designed to implement the functions performed by the system 200. Thus, the processor 210 may receive free text data related to the prospective traveler. The free text data may be provided by the prospective traveler or retrieved by the search engine from online resources (for example, social networks, blogs, and so forth). The processor 210 may extract encoded representation of preferences and goals of the prospective traveler from the free text data and assign levels to the preferences and goals. Furthermore, the processor 210 may compare the levels of the preferences and goals of the prospective traveler to those of a plurality of predefined traveler profiles. One or more of the plurality of traveler profiles that better match the levels of the prospective traveler than the rest of traveler profiles may be selected. Based on the selected traveler profiles, the prospective traveler may be classified. According to the classification, one or more consumer choices may be offered to the prospective traveler. The database 220 may be configured to store at least the free text data, the preferences and goals, the predefined traveler profiles, and so forth.

Figure 3:
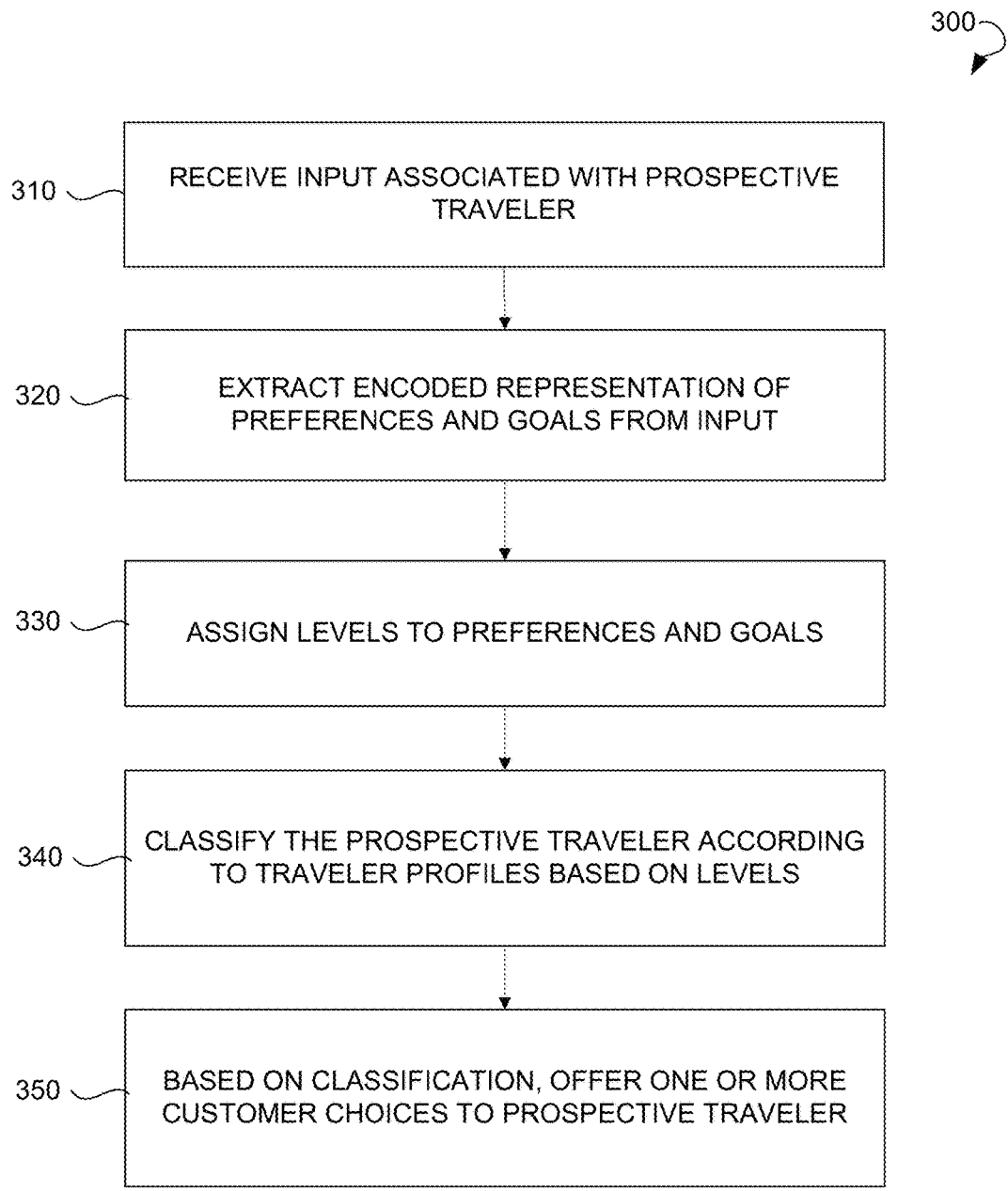
FIG. 3 is a process flow diagram showing a method for classifying a prospective traveler based on statistical inference.

FIG. 3 is a process flow diagram showing a method 300 for classifying a prospective traveler based on statistical inference within the environment described with reference to FIG. 1. The method may commence with receiving input associated with a prospective traveler at operation 310. The input may be received in response to motivational questions and may include free text data.

The input may be processed by the system to extract encoded representation of preferences and goals of the prospective traveler at operation 320. The extracting may be based on intentional semantics and consider the language of the prospective traveler used to describe his needs. In some embodiments, the extracting may be Natural Language Processing (NLP)-enabled.

At operation 330, levels are assigned to preferences and goals. At operation 340, the prospective traveler is classified according to the traveler profiles based on the assigned levels. At operation 350, based on the classification from operation 340, one or more customer choices is offered to the prospective traveler.

FIG. 4 illustrates preference-level combinations that characterize example traveler profiles in airline markets, in accordance with some embodiments. The extracted preferences and goals typically include preference types 402 corresponding to an illustrative preference structure which may include a class of service requested 404, booking delta 406, a ticket fare level 408, a connection count 410, a travel speed 412, a connection time sum 414, and a departure time 416. Each of the extracted preferences and goals may be assigned a certain level.

In an example embodiment, the preferences and goals may be characterized by multiple levels. As an example, FIG. 4 illustrates characterization of the preferences and goals by only three levels: low, medium, and high. However, other embodiments may utilize any other number of levels. Levels may be associated with specific requests with relation to the preference type 402. The class of service requested 404 may be assigned a low level if the prospective traveler, based on the extracted preferences and goals, typically requests an economy class. If the prospective traveler typically requests a business class, the assigned level may be medium, and if the typical class is first class, then the level may be high.

The booking delta 406 may be relative to the expected date of departure. For example, the booking delta 406 within 7 days before departure may be assigned a low level; from 7 to 30 days may be a medium level; and over 30 days may be a high level.

The ticket fare level 408 may be determined by assigning levels to existing options. For example, a range of the total ticket price for all city pairs may be obtained and divided into three levels. The connection count 410 may be defined as the desired number of connections in the itinerary. A low level may be assigned to a non-stop service; a medium level may be 1 connection; and more than 2 connections may be associated with a high level.

The travel speed 412 may be used to suit differentiated products contained within the inventory. A low level may be assigned to a non-stop service; a medium level may be 1 connection; and more than 2 connections may be associated with a high level. The connection time sum 414 may be measured in hours. For example, a time sum of connections below 2 hours may be associated with a low level, 2-6 hours may be a medium level, and over 6 hours may be a high level. The departure time 416 may capture the relationship between desirable departure times and traveler profile.

In some embodiments, the extracted preferences and goals may include only some of the preferences and goals described above. If all seven preference types 402 are extracted and assigned levels, than there exists $3^7$ possible preference-level combinations.

In some embodiments, the preference structure (x) of the prospective traveler may be represented by a vector $(x1, \ldots, x7)$, comprised of the preference levels for the traveler preference structure.

Based on preference-level combinations, the prospective traveler may be classified according to traveler profiles. The classification may be performed with one or more Machine Learning Techniques (MLT), which may include Neural Networks, SVM, Bayesian, and Naïve Bayesian. The highest probability of the prospective traveler fitting the one or more traveler profiles may be determined by using one or more of the MLTs. One or more customer choices may be offered to the prospective traveler based on the classification. In some embodiments, one or more consumer choices of the prospective traveler may be received. Based on the received consumer choices, the prospective traveler may be reclassified.

Thus, a leisure traveler 418 may be associated with a low cabin class, high booking delta, low ticket fare level, and medium connection count, travel speed, connection time sum, and departure time. A business class traveler 424 may be associated with a medium cabin class, low booking delta, high ticket fare level, low connection count, and so forth. Further profiles may be defined for a self-paying business traveler 420, and a reimbursed business traveler 422.

Based on the combinations, an uncertain inference capability may be developed. The uncertain inference capability may allow classifying the prospective traveler in terms of three high level attributes of a prospective traveler: price sensitivity, time sensitivity, and content affinity. The high level attributes represent dimensions of consumer choice.

In some example embodiments, each dimension of consumer choice may be defined in terms of three discrete categorical states: price sensitivity={low, medium, high}; time sensitivity={low, medium, high}; content affinity={low, medium, high}.

In some embodiments, to classify the prospective traveler, a Naïve Bayesian classifier may be used. Thus, a probability of the prospective customer belonging to a traveler profile may be determined.

For example, the following expression may be used:

$$Pr(c \mid x^*) = \frac{Pr(x^* \mid c)Pr(c)}{Pr(x^*)} = \frac{Pr(x^* \mid c)Pr(c)}{\Sigma c Pr(x^* \mid c)Pr(c)}$$

Where dom(c)={Price Sensitivity; Time Sensitivity; Content Affinity}

Thus, if c=Time Sensitivity, the Naive Bayesian classifier may be computed based on the preference types 402 shown by FIG. 4 (see table 426). The computed posterior probability values for $Pr(c \mid x^*_i)$, for i=1, . . . , 4, may be tabulated as in the table 428. The highest values of the posterior probability may be chosen. These posterior values may agree with how the classifier should function for certain types of travelers.

Figure 5:
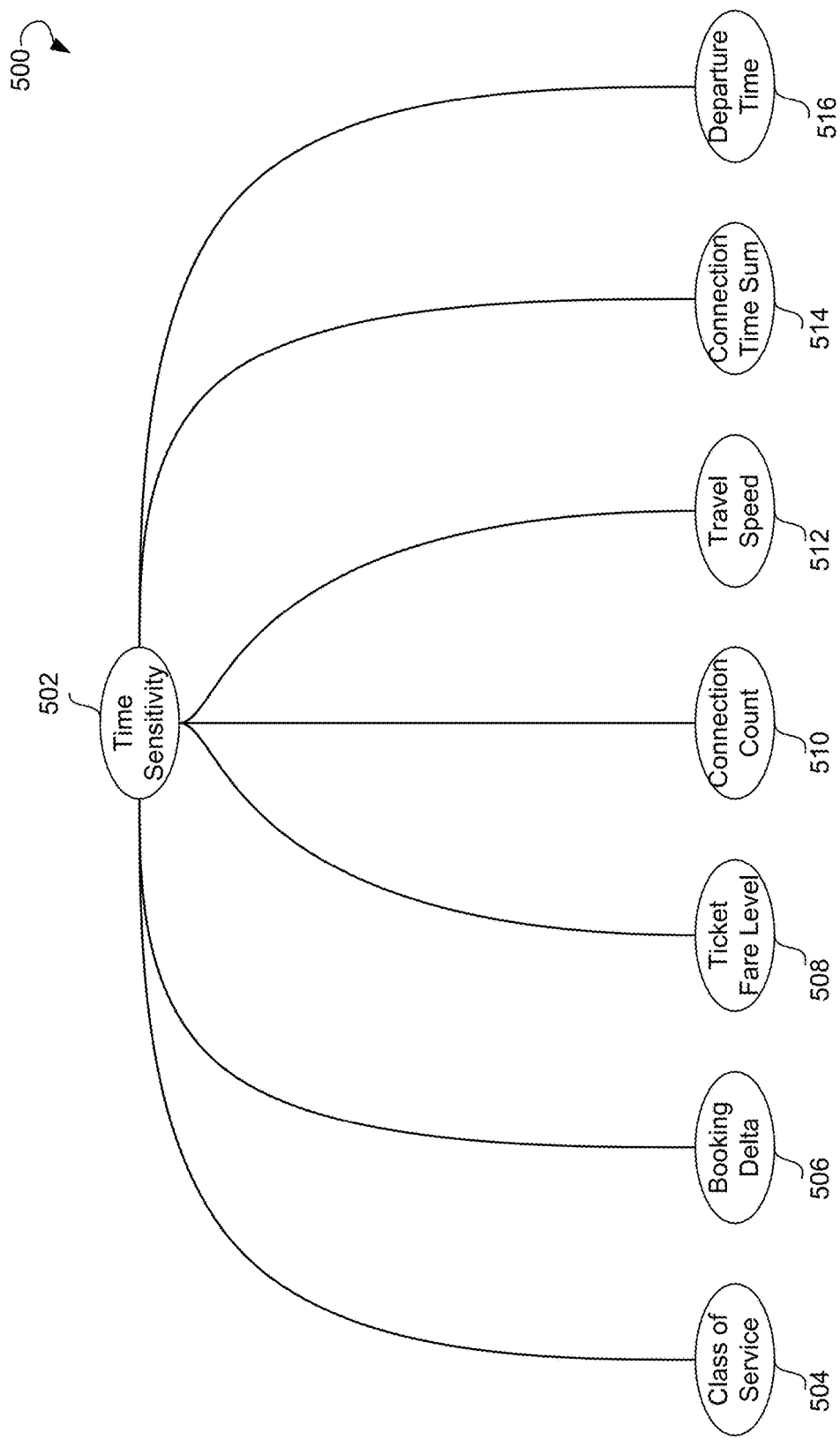
FIG. 5 is a graphical representation of a probabilistic model that represents conditional dependencies for time sensitivity of a prospective traveler.

FIG. 5 is a graphical representation of a probabilistic model 500 that represents conditional dependencies between some preferences and goals and time sensitivity of the prospective traveler. As shown, the preferences and goals associated with the time sensitivity 502 may include a class of service requested 504, booking delta 506, a ticket fare level 508, a connection count 510, travel speed 512, a connection time sum 514, and a departure time 516.

FIG. 6 shows an example representation 600 of a conditional probability table 602 for a time sensitivity network, in accordance with some example embodiments. The conditional probability table 602 represents probability values for the preferences and goals of the prospective traveler with respect to time sensitivity.

Figure 7:
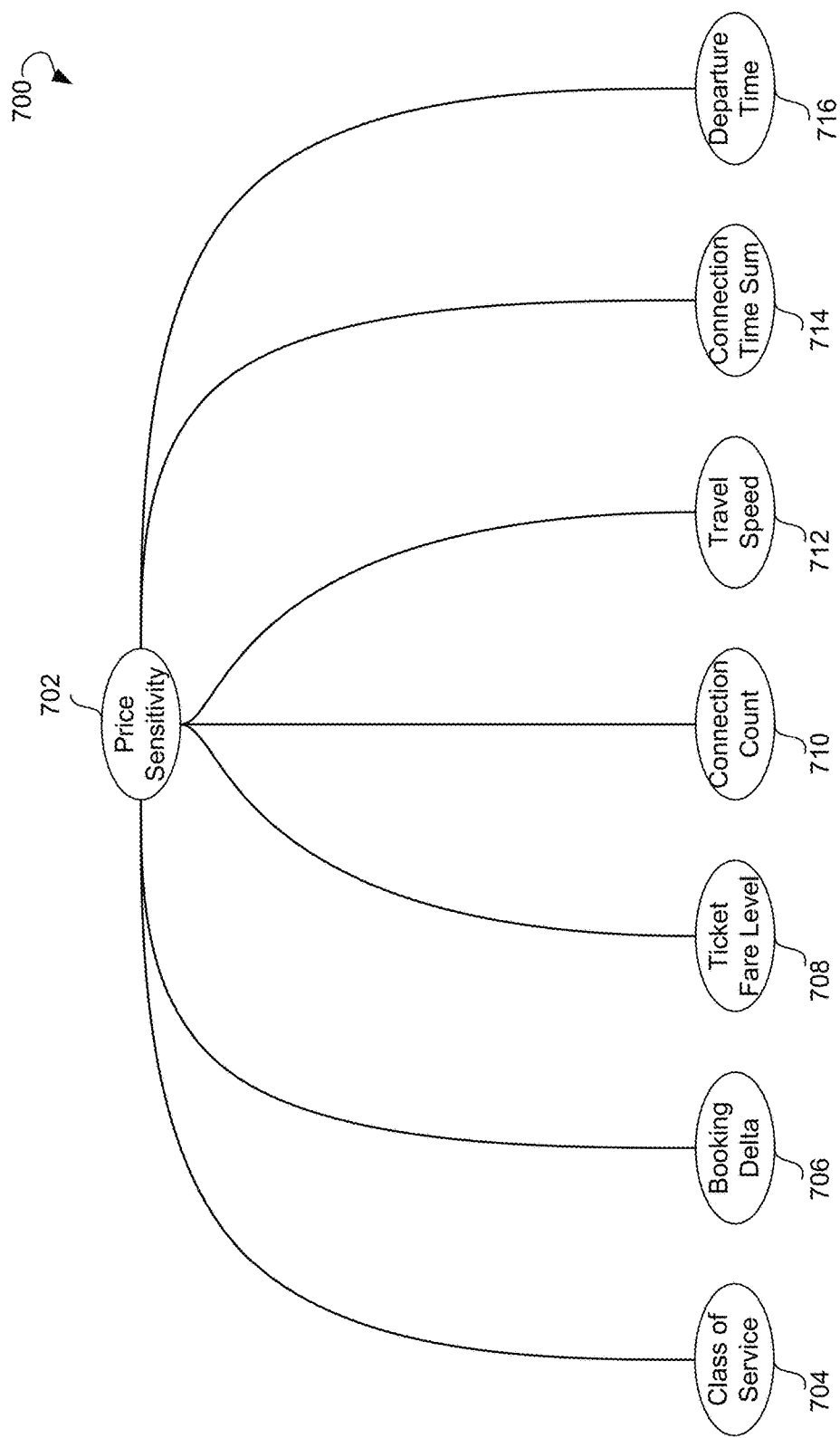
FIG. 7 is a graphical representation of a probabilistic model that represents conditional dependencies for price sensitivity of a prospective traveler.

Similar computations may be performed for other consumer choice dimensions. FIG. 7 illustrates a Bayesian network 700 for price sensitivity 702 of the prospective traveler. As shown, the preferences and goals associated with the price sensitivity 702 may include a class of service requested 704, booking delta 706, a ticket fare level 708, a connection count 710, travel speed 712, a connection time sum 714, and a departure time 716.

FIG. 8 provides an example representation 800 of a conditional probability table 802 for the price sensitivity network. The conditional probability table 802 represents probability values for the preferences and goals of the prospective traveler with respect to price sensitivity.

Figure 9:
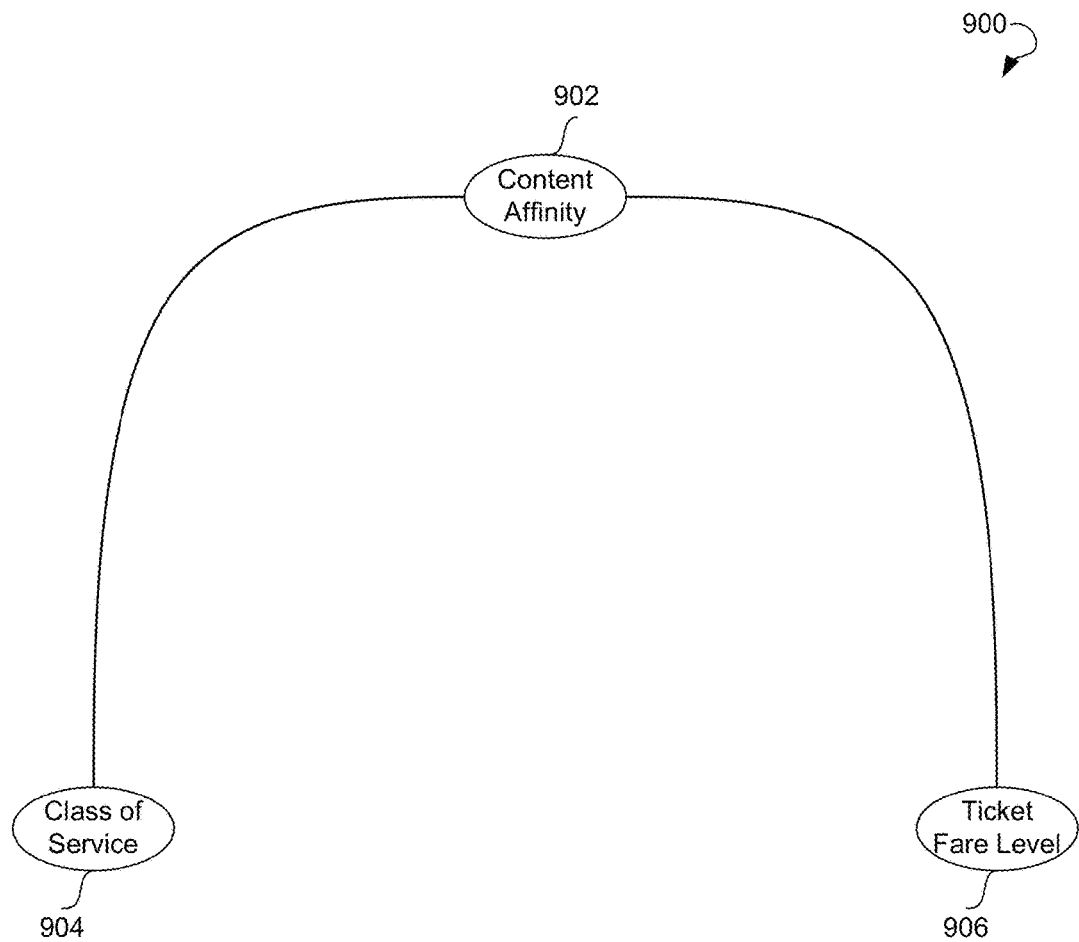
FIG. 9 is a graphical representation of a probabilistic model that represents conditional dependencies for content affinity of a prospective traveler.

FIG. 9 shows a Bayesian network 900 for context affinity 902 of the prospective traveler. As shown, the preferences and goals associated with the context affinity 902 may include a class of service requested 904 and a ticket fare level 906.

Figure 10:
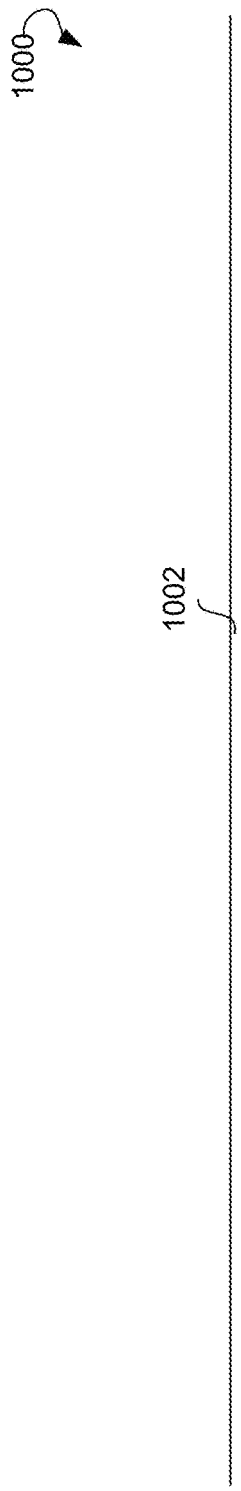
FIG. 10 shows a conditional probability table for a content affinity network.

FIG. 10 provides an example representation 1000 of a conditional probability table 1002 for the context affinity network. The conditional probability table 1002 represents probability values for the preferences and goals of the prospective traveler with respect to context affinity.

Based on the computations for consumer choice dimensions, an inference model of consumer choice may be constructed. The inference model may combine a goal of the prospective traveler, his preference with regard to price and time sensitivities, product characteristics scored with regard to price and time, and so forth.

The consumer choice model may be based on a multi-attribute value function:

$$V(X_P, X_T, X_C),$$

where $X_P$=Price Sensitivity, $X_T$=Time Sensitivity, and $X_C$=Content Affinity.

Formally specifying this model may require characterizing single-attribute value functions for these model criteria, namely: $V_P(X_P)$, $V_T(X_T)$, $V_C(X_C)$.

To characterize the single-dimensional value function for price sensitivity, $V_P(X_P)$, it may be assumed that preferences for price are monotonically decreasing and are represented by the function:

$$V(X_P) = \frac{1 - \exp\left[-\frac{High - X_P}{p}\right]}{1 - \exp\left[-\frac{High - Low}{p}\right]},$$

where Low and High are the lowest and highest levels, respectively, of Xp; over this range, V maps to the unit interval, and ρ is the exponential constant.

An important element of the characterization of the multi-attribute value function $V(X_P, X_T, X_C)$ may be an algorithmic procedure for appropriately specifying ρ. Proper characterization of ρ is associated, for a given consumer, with identification of the midvalue for the range of available prices. Thus, for example, if the score where difference in value between lowest score and midvalue is the same as the difference in value between midvalue and highest score, Xp (midvalue)=0.5.

Using the exponential value function specified previously, the following equation for r may be solved:

$$0.5 = \frac{1 - \exp\left(-\frac{z_{0.5}}{r}\right)}{1 - \exp\left(-\frac{1}{r}\right)},$$

where z denotes the normalized midvalue.

A closed form solution does not exist for this relation, so it may be solved numerically. A given midvalue of the customer is, essentially, an unknown quantity. However, some data about this value may be inferred by utilizing posterior probabilities from Bayesian inference, by conducting statistical analysis of prices for products in choice set, and so forth. The relationship between the midvalue, mid-range, and values of ρ may be explored. If midvalue is (roughly) equal to the mid-range of the High and Low values, then V(Xp) is, essentially, a linear function. If midvalue is greater than the sum of High and Low divided by 2, then ρ may be greater than zero. If midvalue is less than the sum of High and Low divided by 2, then ρ may be less than zero.

For small sample sizes (n≈4 to 20) drawn from a sufficiently platykurtic distribution (i.e., possessing negative excess kurtosis, γ2), the mid-range (High+Low)/2 is an efficient estimator for the mean μ. The mid-range value may serve as a "reference" point around which a statistical "estimation" procedure for ρ may be designed.

Specifically, a "triangulation" strategy may be pursued. The "triangulation" strategy may use statistical analysis of product prices to construct a "confidence limit" for the midvalue of the customer and may average the trio of midvalue estimates that emerge from this process, using the previously computed Bayesian posterior probabilities associated with price sensitivity.

An example Algorithm 1 may be used for triangulation procedure for ρ:

Require: Products $\{I_1, \ldots, I_n\}$, n≤30

---

1: function Triangulation($\{I_1, \ldots, I_n\}$, $Pr_L$, $Pr_M$, $Pr_H$})
2:     $\{p_1, \ldots, p_n\} \leftarrow \{I_{(1)}, \ldots, I_{(n)}\}$    ▷ Rank-ordered prices
3:     Low $\leftarrow \min\{p_i\}$
4:     High $\leftarrow \max\{p_i\}$
5:     $\bar{x} \leftarrow$ sample mean for $\{p_1, \ldots, p_n\}$
6:     $s^2 \leftarrow$ sample variance for $\{p_1, \ldots, p_n\}$
7:     $\alpha \leftarrow 0.05$                 ▷ Bounding coefficient
8:     $v \leftarrow n - 1$        ▷ Degrees of freedom for t distribution
9:
$$(a, b) \leftarrow \left(\bar{x} - t_{\alpha/2}\left(\frac{s}{\sqrt{n}}\right), \bar{x} + t_{\alpha/2}\left(\frac{s}{\sqrt{n}}\right)\right)$$

10:
$$z \leftarrow \left(\frac{\text{High} - a}{\text{High} - \text{Low}}, \frac{\text{High} - \bar{x}}{\text{High} - \text{Low}}, \frac{\text{High} - b}{\text{High} - \text{Low}}\right) \quad \triangleright \text{Normalize values}$$

11:
$$r \leftarrow 0.5 = \frac{1 - \exp(-z/r)}{1 - \exp(-1/r)} \quad \triangleright \text{Solve for r three times}$$

12:     $\rho = (\rho_L, \rho_M, \rho_H) \leftarrow (\text{High} - \text{Low}) \cdot r$
13:     return $EV(\rho) \leftarrow Pr_H \times \rho_L + Pr_M \times \rho_M + Pr_L \times \rho_H$
14: end function

---

Numerically, the triangulation procedure may be expressed as follows:

1. $\{I_1; \ldots; I_7\}$; and
$P_{r_L} = 0.10$
$P_{r_M} = 0.20$
$P_{r_H} = 0.70$
2. {279, 315, 399, 425, 505, 616, 849}
3. Low=279
4. High=849
5. $\bar{x}$=484
6. $s^2$=38, 730.33
7. α=0:05
8. V=7−1=6
9. (a, b)=(301.99, 666.01)
10. z=(0.96, 0.64, 0.32)
11. r=(−−0.06, −0.85, 0.63)
12. ρ=(−34.2, −484.5, 359.1)
13. EV(ρ)=151.05

In such a way, products with a high probability of being purchased by the prospective traveler may be determined. In the presented example, seven illustrative itineraries are selected.

Characterizing time sensitivity within the value model may be based on the manner and degree of specifying time factors of the preferences and goals of the prospective traveler. The time factors may include the degree of specificity (e.g., "morning," "afternoon," 3 pm, and so forth), strength of time-related preference, and so forth. To characterize and value the valuation of time of the prospective traveler within the multi-attribute framework, the following cases can be considered: articulation of categorical time preferences and articulation of "sharp" or "crisp" time preferences.

For purposes of illustration, a constructed attribute that measures how close a given product is to a specified departure time goal may be utilized. Preference values may be assumed to be valued symmetrically around a given goal; however, prospective travelers may value pre- and post-goal product times differently.

For example, the attribute $X_T$ may be defined as follows:

$$x_T = \begin{cases} 0, & \text{if consistent with departure time goal} \\ 1, & \text{if within 1.5 hrs of goal} \\ 2, & \text{if within 3 hrs of goal} \\ 3, & \text{if within 4.5 hrs of goal} \\ 4, & \text{if within 6 hrs of goal} \end{cases}$$

Figure 11:
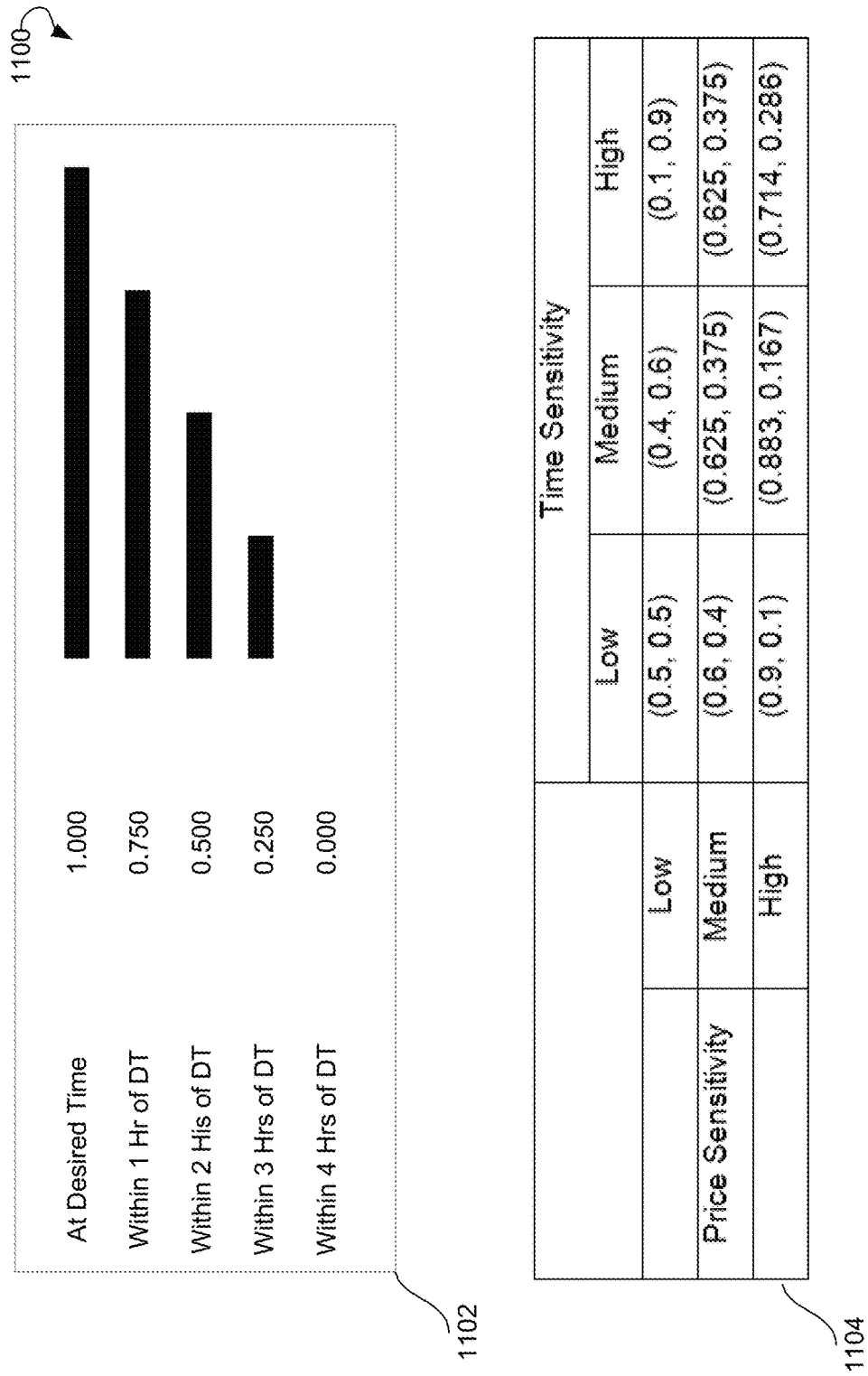
FIG. 11 illustrates a definition of a linear function for characterizing time sensitivity.

It may be assumed that the single-attribute value function characterizing time sensitivity is a linear function. In an example embodiment, the linear function may be defined as shown by table 1102 of FIG. 11.

A linear additive value model may be applied. The linear additive value model may take the form: $V(X_P, X_T) = W_P * V_P(X_P) + W_T * V_T(X_T)$.

To parameterize the linear additive model, Price Sensitivity×Time Sensitivity scenarios that emerge from the Bayesian inference capabilities may be used.

Each scenario gives rise to an order pair containing the parameter-specific values for $W_P$ and $W_T$, respectively, as illustrated by table 1104.

For example, the assumed goal of the prospective traveler may be 2:00 pm departure time. The list of products (for example, itineraries for the prospective traveler) that was considered with reference to price sensitivity may be considered again. The list of products may include, for example, itinerary 1 with price $279 and departure time 6:00 am, itinerary 2 with price $315 and departure time 11:00 am, itinerary 3 with price $399 and departure time 3:00 pm, itinerary 4 with price $425 and departure time 3:30 pm, itinerary 5 with price $505 and departure time 6:00 pm, itinerary 6 with price $616 and departure time 2:00 pm, and itinerary 7 with price $849 and departure time 1:30 pm.

Figure 12:
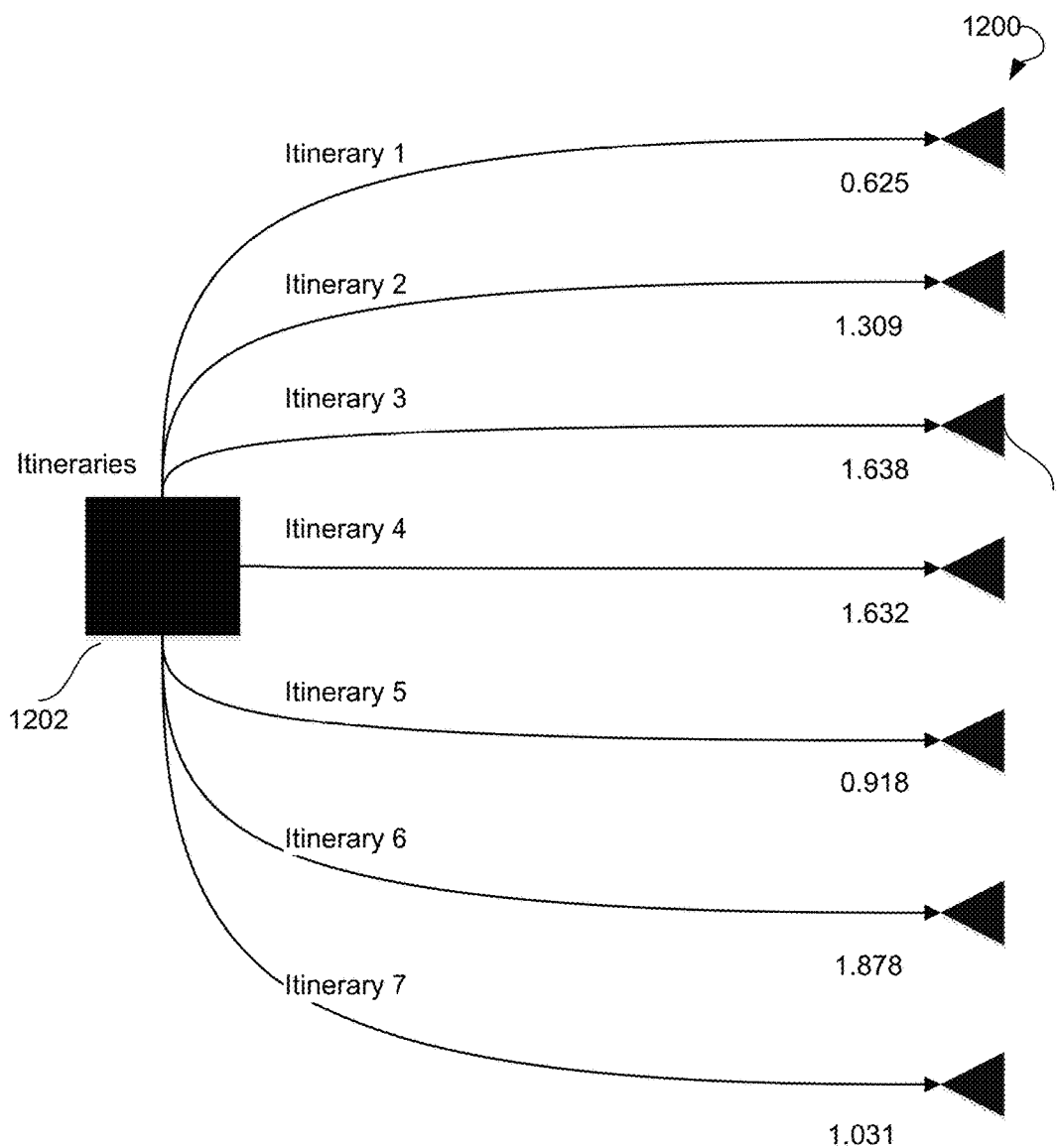
FIG. 12 illustrates a numerical representation of a product ranking.

In this case, only the front-end of the planning problem (i.e., origin) may be considered; the tail-end may be modeled in an analogous fashion. For each of the itineraries, the probability that the prospective traveler may choose it may be estimated. The probability may be expressed numerically as shown by FIG. 12. FIG. 12 shows example itineraries 1-7 1202 considered based on Price Sensitivity=Medium and Time Sensitivity=High levels.

Figure 13:
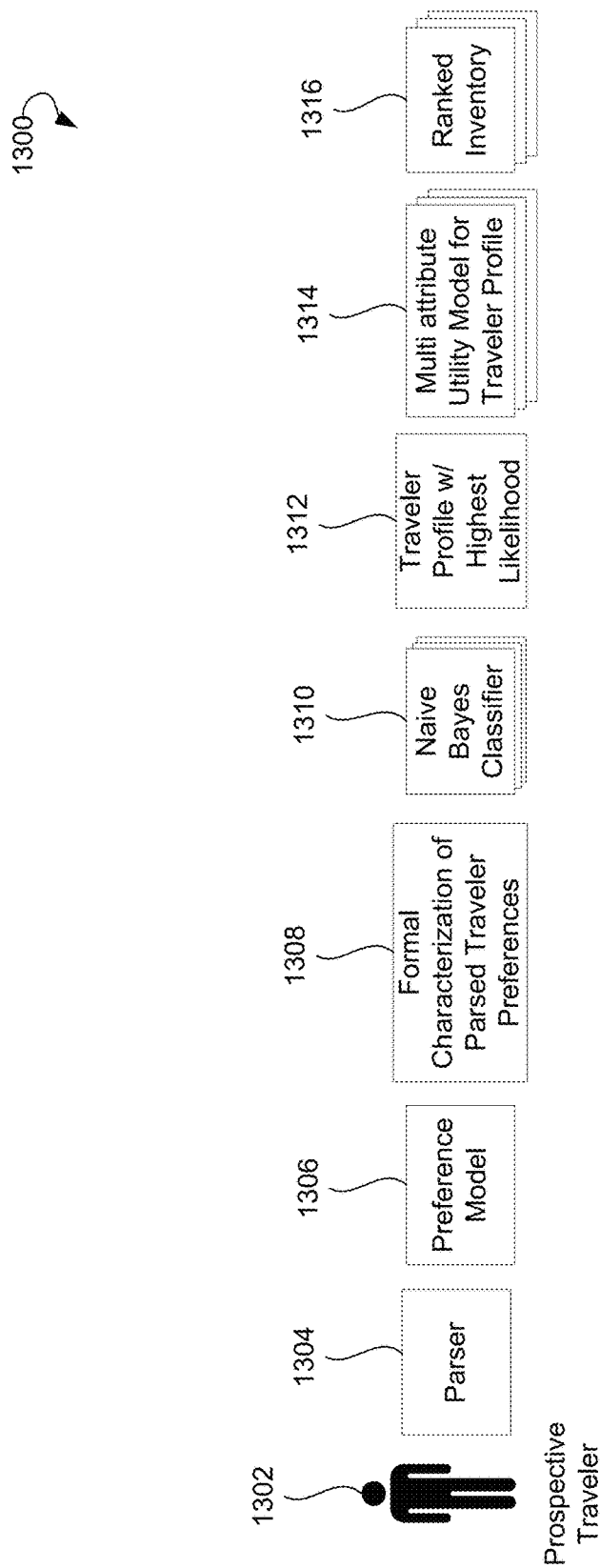
FIG. 13 illustrates an example representation of classifying a prospective traveler using a statistical inference model.

FIG. 13 shows another representation 1300 of classifying a prospective traveler 1302 using a statistical inference model. The input associated with the prospective traveler 1302 may be processed by a parser 1304 to extract preferences and goals which are used to build a preference model 1306. The parsed preferences may be formally characterized 1308. A Naïve Bayes classifier 1310 may be applied to the characterized preferences. As a result, a traveler profile 1312 to which the prospective traveler most likely belongs may be determined.

Based on the traveler profile assigned to the prospective traveler, a multi-attribute utility model 1314 may be built. Using the multi-attribute utility model 1314, available products may be estimated. The products best matching the multi-attribute utility model 1314 may be selected and ranked. A predetermined number of the ranked products 1316 may be offered to the prospective traveler.

Figure 14:
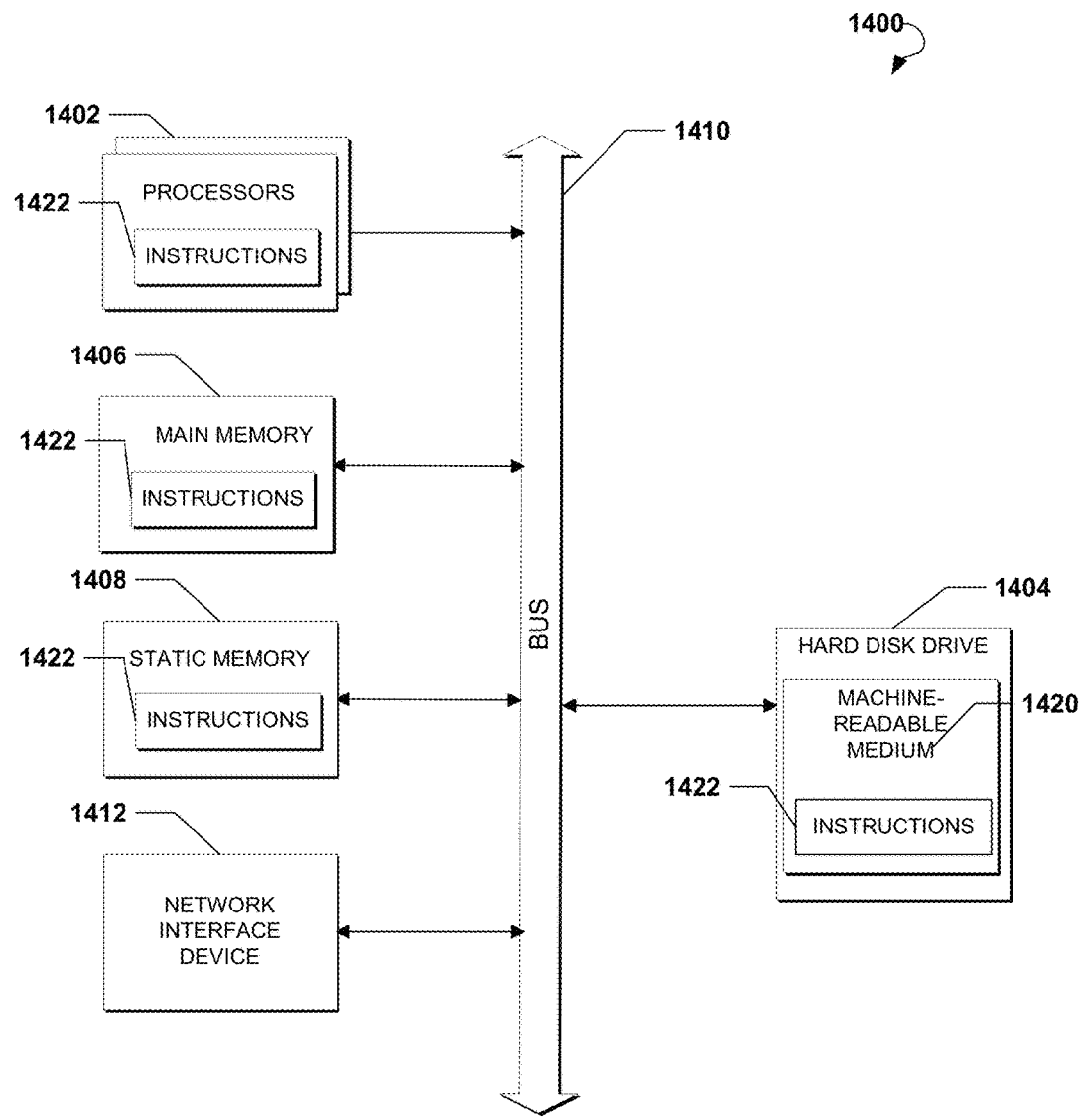
FIG. 14 shows a diagrammatic representation of a computing device for a machine in the exemplary electronic form of a computer system, within which a set of instructions for causing the machine to perform any one or more of the methodologies discussed herein can be executed.

FIG. 14 shows a diagrammatic representation of a machine in the example electronic form of a computer system 1400, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box (STB), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor or multiple processors 1402 (e.g., a CPU, a graphics processing unit (GPU), or both), a main memory 1406, and a static memory 1408, which communicate with each other via a bus 1410. The computer system 1400 may further include a video display unit (e.g., a liquid crystal display (LCD) or a cathode ray tube (CRT)). The computer system 1400 may also include an alphanumeric input device (e.g., a keyboard), a cursor control device (e.g., a mouse), a disk drive unit 1404, a signal generation device (e.g., a speaker), and a network interface device 1412.

The disk drive unit 1404 includes a non-transitory computer-readable medium 1420, on which is stored one or more sets of instructions and data structures (e.g., instructions 1422) embodying or utilized by any one or more of the methodologies or functions described herein. The instructions 1422 may also reside, completely or at least partially, within the main memory 1406 and/or within the processors 1402 during execution thereof by the computer system 1400. The main memory 1406 and the processors 1402 may also constitute machine-readable media.

The instructions 1422 may further be transmitted or received over a network via the network interface device 1412 utilizing any one of a number of well-known transfer protocols (e.g., HyperText Transfer Protocol (HTTP)).

In some embodiments, the computer system 1400 may be implemented as a cloud-based computing environment, such as a virtual machine operating within a computing cloud. In other embodiments, the computer system 1400 may itself include a cloud-based computing environment, where the functionalities of the computer system 1400 are executed in a distributed fashion. Thus, the computer system 1400, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners, or such systems may be accessible to outside users who deploy applications within the computing infrastructure to obtain the benefit of large computational or storage resources.

The cloud may be formed, for example, by a network of web servers that comprise a plurality of computing devices, such as a computing device of system 200, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The corresponding structures, materials, acts, and equivalents of all means or steps plus function elements in the claims below are intended to include any structure, material, or act for performing the function in combination with other claimed elements as specifically claimed. The description of the present technology has been presented for purposes of illustration and description, but is not intended to be exhaustive or limited to the disclosure. Many modifications and variations will be apparent to those of ordinary skill in the art without departing from the scope and spirit of the disclosure. Exemplary embodiments were chosen and described in order to best explain the principles of the present technology and its practical application, and to enable others of ordinary skill in the art to understand the disclosure for various embodiments with various modifications as are suited to the particular use contemplated.

Aspects of the present technology are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Thus, computer-implemented methods and systems for classifying a prospective traveler based on statistical inference are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A computer-implemented method for classifying a prospective traveler based on a statistical inference, the method comprising:
    receiving, by a processor, input associated with the prospective traveler, the input including at least free text data provided by the prospective traveler and data from one or more online resources associated with the prospective traveler, the one or more online resources being retrieved by a search engine;
    parsing the received input by a parser to extract the free text data;
    extracting, by the processor, an encoded representation of a plurality of preferences and goals from the free text data parsed by the parser and from the data from the one or more online resources retrieved by the search engine;
    assigning, by the processor, one of a plurality of preference levels to each of the preferences and goals to define a preference structure of the prospective traveler, the preference structure represented by a vector comprising each of the assigned preference levels for each of the preferences and goals;
    aggregating the assigned preference levels for each of the preferences and goals represented in the preference structure;
    based on the aggregating the assigned preference levels for each of the preferences and goals represented in the preference structure:
        determining a numerical value representing a highest probability of the prospective traveler fitting one or more predefined traveler profiles using one or more machine learning techniques; and
        classifying the prospective traveler according to the one or more predefined traveler profiles;
    developing an uncertain inference capability to classify the prospective traveler in terms of a first high level attribute of a plurality of high level attributes, wherein the uncertain inference capability comprises a probabilistic inference model representing conditional dependences between the first high level attribute and the preferences and goals associated with the first high level attribute;
    constructing a multi-attribute inference model of consumer choice from the uncertain inference capability of the first high level attribute, an uncertain inference capability of a second high level attribute, and product characteristics scored;
    determining a plurality of products with a high probability of being purchased by the prospective traveler using a triangulation statistical analysis of the product characteristics;
    estimating a numerical probability value that the prospective traveler will choose one of the plurality of products, the numerical probability value estimated for at least two of the plurality of products; and
    offering, by the processor, one or more consumer choices to the prospective traveler via graphical elements on a graphical user interface by displaying a predetermined number of the plurality of products to the prospective traveler on the graphical user interface, in order of the numerical probability value that the prospective traveler will choose the product, the processor being configured to receive a selection by the prospective traveler of the one or more offered consumer choices.

2. The method of claim 1, wherein the free text data includes one or more of the following: natural language text, voice data, and oral exchange.

3. The method of claim 1, wherein the one or more predefined traveler profiles include at least a leisure traveler, a self-paying business traveler, a reimbursed traveler, and a business class traveler.

4. The method of claim 1, wherein the predefined traveler profile defines a choice of the prospective traveler according to time sensitivity, price sensitivity, and content affinity.

5. The method of claim 1, wherein the offering includes prioritizing the one or more consumer choices based on the one or more predefined traveler profiles.

6. The method of claim 1, further comprising:
    receiving a response of the prospective traveler to the one or more consumer choices;
    analyzing the response of the prospective traveler;
    based on the analysis, determining that one or more purchase decisions of the prospective traveler contradicts the preference levels assigned to the preferences and goals;
    based on the determining, re-assigning the preference levels to the preferences and goals; and
    offering further one or more consumer choices to the prospective traveler.

7. A system for classifying a prospective traveler based on statistical inference, the system comprising:
    a processor configured to:
        receive input associated with the prospective traveler, the input including at least free text data provided by the prospective traveler and data from one or more online resources associated with the prospective traveler, the free text data being parsed by a parser and the data from the one or more online resources being retrieved by a search engine;

extract encoded representation of preferences and goals from the free text data parsed by the parser and the data from the one or more online resources retrieved by the search engine;

assign levels to the encoded representation of preferences and goals to define a preference structure of the prospective traveler;

classify the prospective traveler according to one or more traveler profiles based on the levels assigned to the encoded representation of preferences and goals by matching the preference structure of the prospective traveler to one or more preference structures associated with the one or more traveler profiles, the classifying performed with at least one or more machine learning techniques;

develop an uncertain inference capability to classify the prospective traveler in terms of a first high level attribute of a plurality of high level attributes, wherein the uncertain inference capability comprises a probabilistic inference model representing conditional dependences between the first high level attribute and the preferences and goals associated with the first high level attribute;

construct a multi-attribute inference model of consumer choice from the uncertain inference capability of the first high level attribute, an uncertain inference capability of a second high level attribute, and product characteristics scored, the multi-attribute inference model being based on computations for consumer choice dimensions, the multi-attribute inference model being applied to identify one or more consumer choices to be offered to the prospective traveler;

determine a plurality of products with a high probability of being purchased by the prospective traveler using a triangulation statistical analysis of the product characteristics;

estimate a numerical probability value that the prospective traveler will choose one of the plurality of products, the numerical probability value estimated for at least two of the plurality of products; and offer the one or more consumer choices to the prospective traveler via graphical elements on a graphical user interface by displaying a predetermined number of the plurality of products to the prospective traveler on the graphical user interface, in order of the numerical probability value, the processor being configured to receive a selection by the prospective traveler of the one or more offered consumer choices; and a database in communication with the processor configured to store at least the input and the preferences and goals.

8. The system of claim 7, wherein the free text data includes one or more of the following: natural language text, voice data, and oral exchange.

9. The system of claim 7, wherein the one or more traveler profiles include at least a leisure traveler, a self-paying business traveler, a reimbursed traveler, and a business class traveler.

10. The system of claim 7, wherein the one or more traveler profiles define a choice of the prospective traveler according to time sensitivity, price sensitivity, and content affinity.

11. The system of claim 10, wherein the encoded representation of preferences and goals are associated with the time sensitivity, wherein the encoded representation of preferences and goals associated with the time sensitivity include one or more of the following: a class of service requested, a booking delta, a ticket fare level, a connection count, a travel speed, a connection time sum, and a departure time.

12. The system of claim 10, wherein the encoded representation of preferences and goals are associated with the price sensitivity, wherein the encoded representation of preferences and goals associated with the price sensitivity include one or more of the following: a class of service requested, a booking delta, a ticket fare level, a connection count, a travel speed, a connection time sum, and a departure time.

13. The system of claim 10, wherein the encoded representation of preferences and goals are associated with the content affinity, wherein the encoded representation of preferences and goals associated with the content affinity include one or more of the following: a class of service requested and a ticket fare level.

14. The system of claim 10, wherein the multi-attribute inference model is based on a multi-attribute value function.

15. A system for classifying a prospective traveler based on statistical inference, the system comprising:

a processor configured to:

receive input associated with the prospective traveler, the input including at least free text data provided by the prospective traveler and data from one or more online resources associated with the prospective traveler, the free text data being parsed by a parser, the data from the one or more online resources being retrieved by a search engine;

extract encoded representation of preferences and goals from the free text data parsed by the parser and the data from the one or more online resources retrieved by the search engine;

assign levels to the encoded representation of preferences and goals to identify a preference structure of the prospective traveler;

classify the prospective traveler according to one or more traveler profiles based on the levels assigned to the encoded representation of preferences and goals by matching the preference structure of the prospective traveler to one or more preference structures associated with the one or more traveler profiles, the classifying performed with at least one or more machine learning techniques;

develop an uncertain inference capability to classify the prospective traveler in terms of a first high level attribute of a plurality of high level attributes, wherein the uncertain inference capability comprises a probabilistic inference model representing conditional dependences between the first high level attribute and the preferences and goals associated with the first high level attribute;

construct a multi-attribute inference model of consumer choice from the uncertain inference capability of the first high level attribute, an uncertain inference capability of a second high level attribute, and product characteristics scored;

determine a plurality of products with a high probability of being purchased by the prospective traveler using a triangulation statistical analysis of the product characteristics;

estimate a numerical probability value that the prospective traveler will choose one of the plurality of products, the numerical probability value estimated for at least two of the plurality of products;

identify one or more consumer choices to the prospective traveler using the inference models; and offer the one or more consumer choices to the prospective traveler via graphical elements on a graphical user interface by displaying a predetermined number of the plurality of products to the prospective traveler on the graphical user interface, in order of the numerical probability value, the processor being configured to receive a selection by the prospective traveler of the one or more offered consumer choices; and a database in communication with the processor configured to store at least the input, the preferences and goals, and the inference models.

16. The method of claim 1, wherein the plurality of high level attributes comprises at least two of price sensitivity, time sensitivity, and content affinity.

17. The method of claim 1, further comprising receiving a selection of the one or more consumer choices of the prospective traveler;

and reclassifying the prospective traveler based on the received selection.

18. The method of claim 1, wherein the one or more machine learning techniques comprise at least one of a neural network, SVM, Bayesian, and naïve Bayesian.

19. The method of claim 1, wherein the plurality of preferences and goals include at least one of: a class of service requested, a booking delta, a ticket fare level, a connection count, a travel speed, a connection time sum, and a departure time.

* * * * *